United States Patent
Li (10) Patent No.: US 7,469,145 B2
(45) Date of Patent: Dec. 23, 2008

(54) COMMUNICATION SYSTEM

(75) Inventor: Changhong Li, Espoo (FI)

(73) Assignee: Nokia Corporation, Espoo (FI)

( * ) Notice: Subject to any disclaimer, the term of this patent is extended or adjusted under 35 U.S.C. 154(b) by 35 days.

(21) Appl. No.: 10/942,038

(22) Filed: Sep. 16, 2004

(65) Prior Publication Data

US 2005/0176438 A1 Aug. 11, 2005

(30) Foreign Application Priority Data

Feb. 6, 2004 (GB) ............................. 0402657.1

(51) Int. Cl.
*H04Q 7/20* (2006.01)

(52) U.S. Cl. .................. 455/450; 455/403; 455/445; 455/435.1; 455/435.2; 455/435.3; 455/410

(58) Field of Classification Search ............... 455/403, 455/445, 450, 435.1, 435.2, 435.3, 432.3, 455/410; 709/313, 249, 245; 320/345
See application file for complete search history.

(56) References Cited

U.S. PATENT DOCUMENTS

| | | | | |
|---|---|---|---|---|
| 6,104,929 | A * | 8/2000 | Josse et al. ................. | 455/445 |
| 2002/0111153 | A1 | 8/2002 | Hartmaier et al. | |
| 2003/0037176 | A1 * | 2/2003 | Dannehr et al. ............ | 709/313 |
| 2003/0139182 | A1 | 7/2003 | Bakkeby et al. | |
| 2003/0208628 | A1 * | 11/2003 | Karjanlahti ................. | 709/249 |
| 2004/0157582 | A1 * | 8/2004 | Peglion et al. .............. | 455/403 |
| 2004/0228347 | A1 * | 11/2004 | Hurtta et al. ............. | 370/395.2 |
| 2004/0243720 | A1 * | 12/2004 | Haumont et al. ........... | 709/245 |
| 2005/0020234 | A1 * | 1/2005 | Iivari et al. ................. | 455/403 |

FOREIGN PATENT DOCUMENTS

| | | |
|---|---|---|
| EP | 1 189 473 A2 | 3/2002 |
| EP | 1 223 737 A1 | 7/2002 |
| WO | WO 98/34425 | 8/1998 |
| WO | WO 01/65872 A1 | 9/2001 |

OTHER PUBLICATIONS

3rd Generation Partnership Project—3GPP: "ETSI TS 123 015—v5.0.0; Digital cellular telecommunications system (Phase 2+); Universal Mobile Telecommunications System (UMTS); Technical realization of Operator Determined Barring (ODB)—Release 5"; pp. 1-23.

* cited by examiner

*Primary Examiner*—David Q Nguyen
(74) *Attorney, Agent, or Firm*—Squire, Sanders & Dempsey, L.L.P.

(57) ABSTRACT

A system deactivates an established communication channel between a user station and an access point. The system provides a service to the user station. The system transfers user data stored in a database entity to a serving controller connected between the user station and the access point. The system defines at the serving controller that the user station is not permitted to access the service, and allows for deactivation of the established communication channel based on the transferred user data.

31 Claims, 5 Drawing Sheets

GPRS: General Packet Radio Service

MS: Mobile Station
BSS: Base Station System
UTRAN: UMTS Terrestrial Radio Access Network
SGSN: Serving GPRS Support Nodes
GGSN: GPRS Gateway Support Nodes
HLR: Home Location Register
MSC: Mobile Station Controller
VLR: Visited Location Register

COMMUNICATION SYSTEM

The present invention relates to communication session control in a communication system, and in particular, but not exclusively, to control of an established communication session over a packet data network between a user station and another party.

A communication system can be seen as a facility that enables communication sessions between two or more entities such as user equipment, controllers and/or other nodes associated with the system. The communication may comprise, for example, communication of voice, video, data, multimedia and so on. An application session may, for example, comprise a two-way telephone call or multi-way conference session or connection between a user equipment and an application server (AS), such as a service provider server or proxy. The establishment of communication sessions generally enables a user to be provided with various services.

Signalling between various entities associated with a communication session is typically required in order to control the communication session. Control is typically required for the set-up of the communication session and also later on during communication on the established communication session. The signalling can be based on an appropriate communication protocol or protocols.

The communication may be provided by fixed line and/or wireless communication interfaces. An example of the fixed line system is a public switched telephone network (PSTN). The wireless communication may be provided by means of a mobile communication system. Mobile communication systems refers generally to any telecommunications systems which enable a wireless communication when users are moving within the service area of the system. An example of a typical mobile communication system is a Public Land Mobile Network (PLMN).

The mobile communications network can provide an access network providing a user with a wireless access to external networks, hosts, or services offered by specific service providers. The user may need to have a subscribership with the mobile communications system in order to be able to use the services of the mobile system. The mobile subscription information of the subscriber may indicate parameters such as parameters regarding the quality of service (QoS) the subscriber is entitled to receive, priorities, service restrictions, security, authentications, and so on.

An access point or gateway node of the mobile communication network provides further access to an external network or an external host. For example, if the requested service is provided by a service provider located in another network, the service request is routed via a gateway node or access point to the other network and the service provider. The routing may be based on definitions in the mobile subscription information stored in the mobile network.

A more detailed example will now be described with reference to general packet radio service (GPRS). The GPRS operational environment comprises one or more subnetwork service areas, which are interconnected by a GPRS backbone network. A subnetwork may comprise a number of packet data service nodes (SN). In this specification the service nodes will be referred to as serving controller entities or specifically serving GPRS support nodes (SGSN). Each of the SGSNs is connected to radio networks, typically to base station systems and/or radio access networks by way of base station controllers (BSC) and/or radio network controllers (RNC) in such a way that they can provide a packet service for mobile user equipment via several base stations, controlling cells of a cellular network. The intermediate mobile communication network provides packet-switched data transmission between a support node and mobile user equipment. The subnetworks are in turn connected to an external data network, e.g. to a packet data network (PDN), via GPRS gateway support nodes (GGSN). The GPRS thus allow transmission of packet data between mobile user equipment and external data networks.

A packet data protocol (PDP) context may be established to carry traffic flows over the communication system. A PDP context typically includes a radio access bearer provided between the user equipment, the radio network controller and the SGSN, and switched packet data channels provided between the serving GPRS service node and the gateway GPRS service node. A session between the user equipment and other party would then be carried on the established PDP context. A PDP context can carry more than one traffic flow, but all traffic flows within one particular PDP context are treated the same way as regards their transmission across the network. This requirement regarding the similar treatment is based on PDP context treatment attributes associated with the traffic flows. These attributes may comprise, for example, quality of service and/or charging attributes.

In GPRS networks, the mobile user equipment may optionally indicate, in a message requesting to activate a packet data protocol (PDP) context in the network, an access point name (APN) for selection of a reference point to a certain external network. A serving GPRS support node (SGSN) may authenticate the mobile user and send a PDP context creation request to a gateway node (GGSN) selected e.g. according to the access point name given by the user equipment, or to default GGSN known by the SGSN.

Various features can be controlled by the serving controller entity, such as the SGSN, during a communication session. This control may be based on information associated with the subscription and stored in a dedicated subscriber information database. A well-known example of the subscriber information database is a home location register (HLR). Another example is a home subscriber server (HSS).

Various user equipment (UE) such as computers (fixed or portable), mobile telephones and other mobile stations, personal data assistants or organizers, and so on are known to the skilled person. These all can be used to access the packet data networks, e.g. corporate intranets or the Internet, to obtain services. Mobile user equipment, typically referred to as a mobile station (MS), can be defined as a means that is capable of communication via a wireless interface with another device such as a base station of a mobile telecommunication network or any other station. The increasing popularity of Third Generation (3G) communication systems will, in all likelihood, significantly increase the possibilities for accessing services on the packet data networks via mobile user equipment (UE) as well as other types of UE.

The term "service" used above and hereinafter will generally be understood to broadly cover any service or goods which a user may desire, require or be provided with. The term also will generally be understood to cover the provision of complementary services. In particular, but not exclusively, the term "service" will be understood to include browsing, downloading, email, streaming services, Internet Protocol multimedia (IM) services, conferencing, telephony, gaming, rich call, presence, e-commerce and messaging, for example, instant messaging.

Embodiments of the present invention are concerned with so-called "operator determined barring" (ODB), wherein at least one of the operators or service providers decides to bar a user from a service. This can either be initiated by the MS or the network, but it is the operator that decides whether or not a user should be barred from a service.

Broadly speaking in order to activate a PDP context, there is a 2-stage process. Firstly, an initialising process between the HLR and SGSN is undergone in order to establish that the user is indeed a subscriber of the service and that a PDP context can be activated for that user. Briefly this is achieved by examining the contents of the HLR which contains subscriber data and will indicate whether a PDP context is allowed to be activated for a particular user. Secondly, if a PDP context is permitted be set up, the SGSN will establish a radio bearer channel with the user station, or if a PDP context is not permitted to be set up, the SGSN invokes a barring function and the PDP context will not be set up.

The European Telecommunication Standard Institute (ETSI) has a standard specification for implementing ODB. This is currently the Release 5 specification entitled "3GPP TS 23.015 V5.0.0 (2002-06)" and is available from the ETSI website. Thus, the current ETSI specification only describes the possibility of barring a PDP context during the first stage, i.e. during the initialisation process and before the PDP context is set up. Also, in this specification an operator that wants to bar a PDP context for a user, bars the user entirely.

An earlier filed patent application WO 02/093689 published on 21 Nov. 2002 recognises that deletion of a PDP context is not optimal when it is necessary to subsequently unbar that PDP connect (i.e. re-activate a service for a user). In this case, the operator will need to re-create the PDP context, which is often difficult and unreliable since the operator needs to ensure that the re-created PDP context is the same as it was before deletion. This is achieved by adding a functional status flag (i.e. setting bits) to user data stored in the HLR, wherein the added status flag defined for each user will determine whether each user's PDP context is activated or deactivated. This allows a PDP context for a user to be deactivated without being removed from the HLR.

However, the system described in WO 02/093689 is also concerned with activating/deactivation of a PDP context in the first stage only.

At least one aim of embodiments of the present invention are to mitigate these shortcomings.

According to one aspect of the present invention there is provided a method for deactivating an established communication channel between a user station and an access point which provides a service to the user station, the method comprising the steps of: transferring user data stored in a database entity to a serving controller connected between the user station and the access point; defining at the serving controller that that user is not permitted to access that service and deactivating the established communication channel based on the transferred user data.

According to a further aspect of the present invention there is provided a communication system comprising: an access point for providing a service to a user station of the network; a database entity for storing user data corresponding to the user; a serving controller arranged to establish a communication channel between the user station and the access point to deliver the service; and wherein the database entity is operable to transfer user data to the serving controller whereby the serving controller determines that that user is not permitted to access that service and deactivating the established communication channel based on the transferred user data.

According to yet a further aspect of the present invention there is provided a A wireless communication network comprising: an access point for providing a service to a user station of the network; a database entity for storing user data corresponding to the user; a serving controller arranged to establish a communication channel between the user station and the access point to deliver the service; and wherein the database entity is operable to transfer user data to the serving controller whereby the serving controller determines that that user is not permitted to access that service and deactivating the established communication channel based on the transferred user data.

Thus, the present invention provides the advantage that an existing PDP context can be barred, even where the radio bearer channel for the PDP context has already been set up.

For a better understanding of the present invention and to show how the same may be carried into effect, reference will now made by way of example to the accompanying drawings in which:

FIG. 3b shows an example of MS initiated PDP context barring during the initialisation phase of FIG. 3a;

Figure 1:
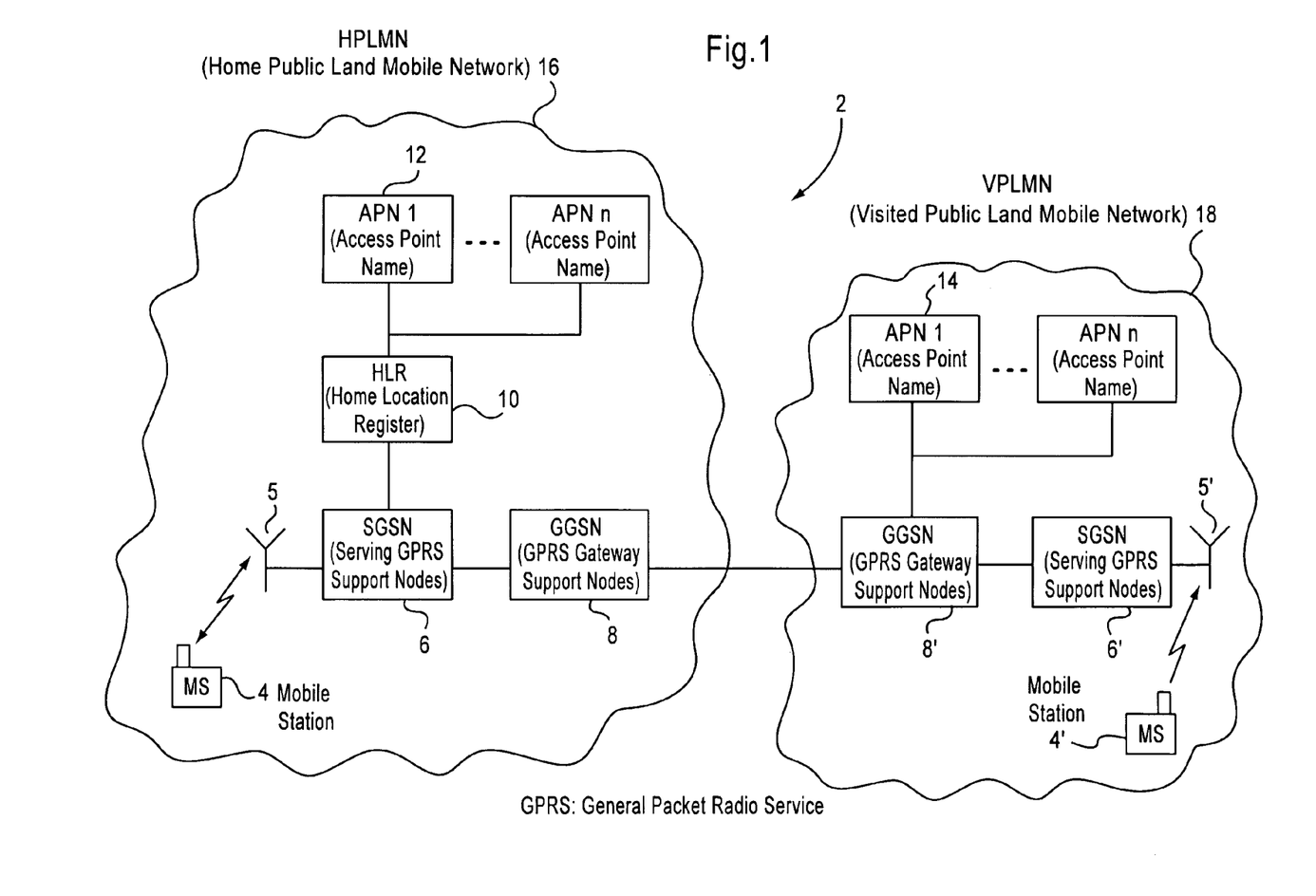
FIG. 1 shows a communication system according to embodiments of the present invention.

FIG. 1 shows a communication system according to an embodiment of the present invention. More particularly, an embodiment of the present invention will be described by way of example, with reference to the architecture of a third generation (3G) mobile communications system. However, it will be understood that certain embodiments may be applied to any other suitable form of network.

The mobile communication system 2 is typically arranged to serve a plurality of user stations 4. In a mobile communication system, the user station preferably takes the form of a mobile phone. Each user station is typically provided with a wireless interface (Um interface) between the user equipment and base station 5 of the communication system 2.

A user station is normally configured for wireless communication with other stations, typically with the base stations of a mobile communication system for enabling mobility thereof. A user station may include an antenna element for wirelessly receiving and/or transmitting signals from and/or to the base stations of the mobile communication system. A user station may also be provided with a display for displaying images and/or other graphical information for the user of the user station. Speaker means are also typically provided. The operation of the user station may be controlled by means of an appropriate user interface, such as control buttons, voice commands and so on. Furthermore, a user station is typically provided with a processor entity and/or a memory means. Communication between the user equipment and the entities of the communication network may be based on any appropriate communication protocol. A user may use the user station for tasks such as, but not limited to, for making and receiving phone calls, for receiving and sending data from and to the network and for experiencing, for example, multimedia content by means of PDP contexts. For example, a user may access the network by means of a Personal Computer (PC), Personal Data Assistant (PDA), mobile station (MS) and so on.

FIG. 1 shows two networks, firstly a HPLM (Home Public Land Mobile Network) 16 and a VPLM (Visited Public Land Mobile Network) 18. The HPLM 16 is the home network of the user. The user station 4 indicates a situation when the user is within the coverage area of a base station 5 of the user's home network. In contrast, the user station 4' indicates a situation when the user has roamed and instead is within the coverage area of a base station 5' of a visited network which is not the user's home network.

It shall be appreciated that although only one user station 4, 4' has been shown in FIG. 1 (albeit in two different situations), typically a number of user equipment would be simultaneously in communication with each of the base stations 5, 5'.

A mobile communication system may logically be divided between a radio access network (RAN) and a core network (CN). In the simplified presentation of FIG. 1, the base station 5 belongs to the radio access network. It shall be appreciated that although FIG. 1 shows the base station of only one radio access network, a typical communication network system usually includes a number of radio access networks.

The 3G radio access network (RAN) is typically controlled by appropriate radio network controller (RNC). This is not shown in order to enhance clarity. The radio network controller RNC is typically connected to an appropriate core network entity or entities such as, but not limited to, a serving general packet radio service support node (SGSN) 6. A subscriber information database entity in the form of a home location register (HLR) 10 is provided for storing information associated with the user of the user station 4 that belongs to the home network 16. The HLR 10 may contain various records associated with the user, such as details of PDP context subscriptions of the user.

The home and visited networks are also shown as having their own set of access point name elements (APN 1 ... n) 12, 14. An APN is a unique identifier of a particular service that is offered by a network operator or an external service provider. In order to avoid confusion, the terminology "subscribed" has been used in relation to a user being subscribed to a particular service offered by an APN, and not to a user that belongs to a particular network. Although it should be appreciated that the user of the user station is more generally subscribed to the home network 16.

A user station within the radio access network may communicate with a radio network controller via radio network channels which are typically referred to as radio bearers (RB). These radio network channels may be set up in a mobile communication system in a known manner. Each user station 4 may have one or more radio network channels open at any one time with the radio network controller. The radio access network controller is in communication with the serving GPRS support node (SGSN) 6 via an appropriate interface.

The GGSN 8, 8' is a gateway GPRS node which either provides a gateway to another PLMN network (i.e. VPLMN) or to some other external network.

Figure 2:
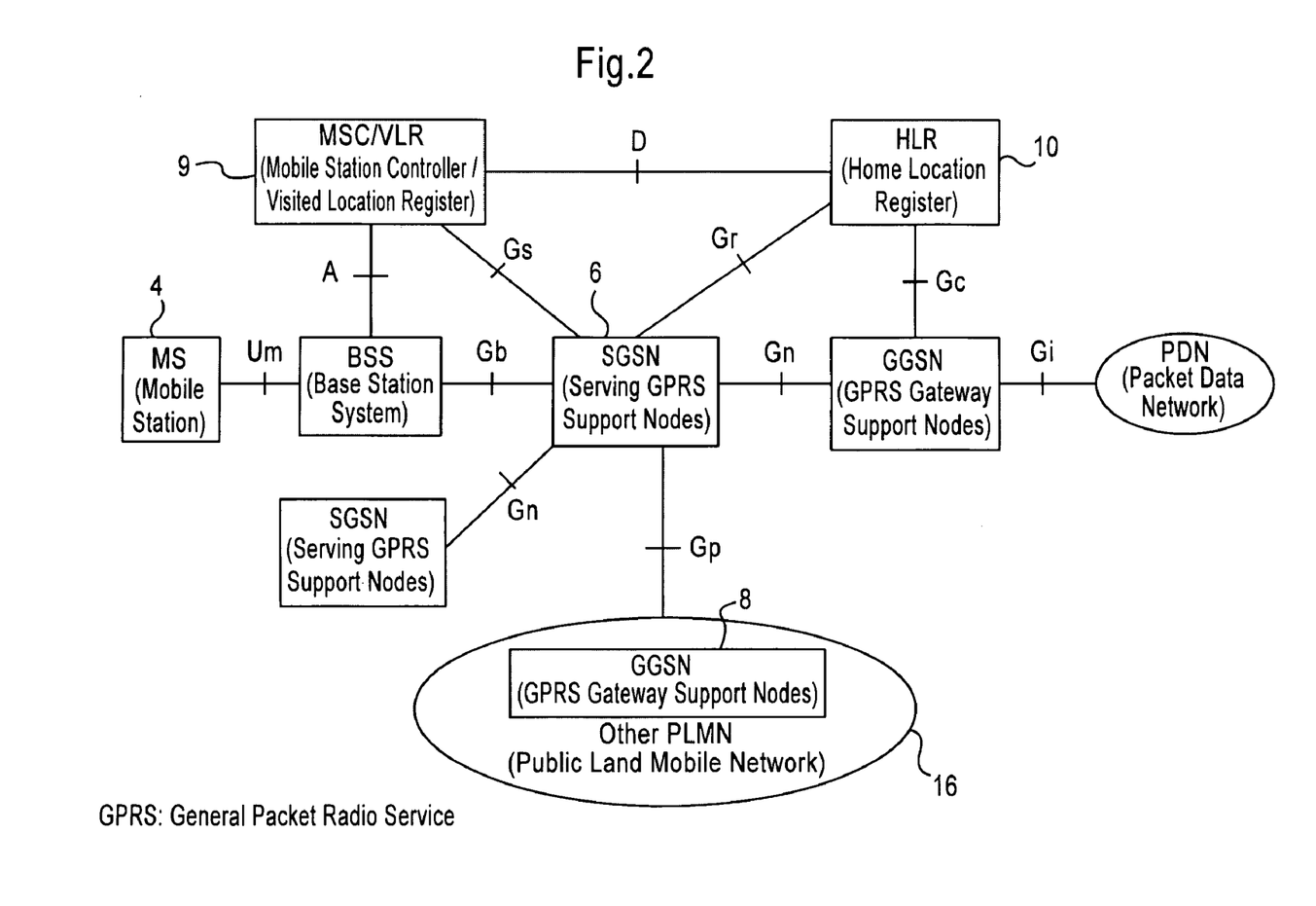
FIG. 2 shows a known logical architecture of the GPRS system.

An overview of the GPRS logical architecture is provided in FIG. 2, which shows the various elements and the established interfaces defined between them, although this is well known to those skilled in the art.

The SGSN 6 typically communicates with a gateway GPRS support node (GGSN) 8 via the GPRS backbone network over the Gn. This interface is commonly a switched packet data interface. The SGSN 6 and/or the GGSN 8 provide support for GPRS services in the network.

Overall communication between the user station 4 and the particular service being offered by one of the APN's 12, 14 is generally provided by a packet data protocol (PDP) context. Once established, a PDP context can typically carry multiple flows. Each flow normally represents, for example, a particular service and/or a component of a particular service. The PDP context therefore often represents a logical communication pathway for one or more flows across the network. To implement the PDP context between user station 4 and the SGSN 6, radio access bearers (RAB) are usually established which commonly allow for data transfer from and to the user equipment. The implementation of these logical and physical channels is known to those skilled in the art and is therefore not discussed further herein.

The user equipment may connect, via the GPRS network, to servers that are generally connected to an external packet data network such as, but not limited to, an Internet Protocol (IP) network.

Figure 3A:
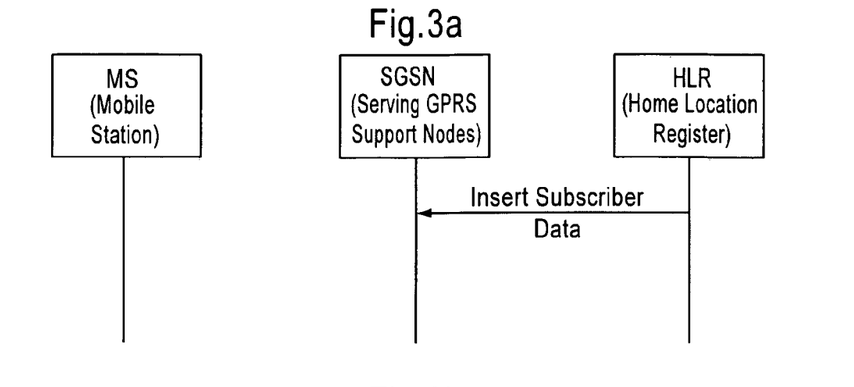
FIG. 3a shows a known method of updating the SGSN for modifying ODB data in the SGSN during an initialisation phase.
Figure 3B:
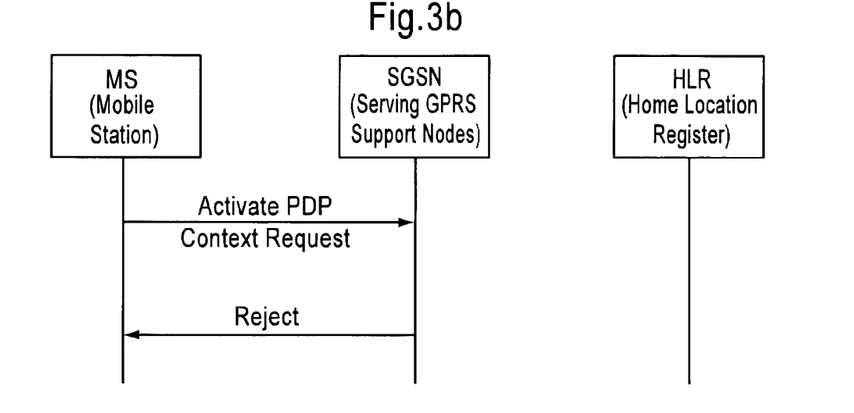

FIGS. 3a and 3b shows the two-stage process for MS initiated barring of a PDP context according to the current ETSI specification. In particular, FIG. 3a shows a first stage when it is decided by the operator to either apply, modify or remove ODB barring for a particular user. In this case, the initial signaling performed between the HLR and the SGSN is done using mobile application part (MAP) messages, i.e. "insert subscriber data". In this manner, barring of packet oriented services is applied to a subscription by administrative action in the HLR, wherein the HLR will update the subscription information accordingly and transfer this updated subscription information to the SGSN. This all takes place before a PDP context has been established.

Then at a subsequent time, the second stage is performed as shown by FIG. 3b, wherein the barring of the PDP context is invoked in the SGSN. That is, if the SGSN receives a request from a user of a MS for PDP context activation which is prohibited by ODB (i.e. barred in the first phase), then the SGSN will return a negative response "Reject" to the request and the PDP context will not be established for that user.

That is, in the current ETSI specification barring of an MS initiated PDP context activation is done before a PDP context is established. The decision to bar is performed by the operator or service provider in the SGSN which refers to the relevant APN 12 or GGSN (for accessing an APN 14 in the visited network 18), wherein a part of the APN is used to decide whether a particular user should be barred or not and this information is supplied to the HLR which in turn updates the SGSN.

Figure 4:
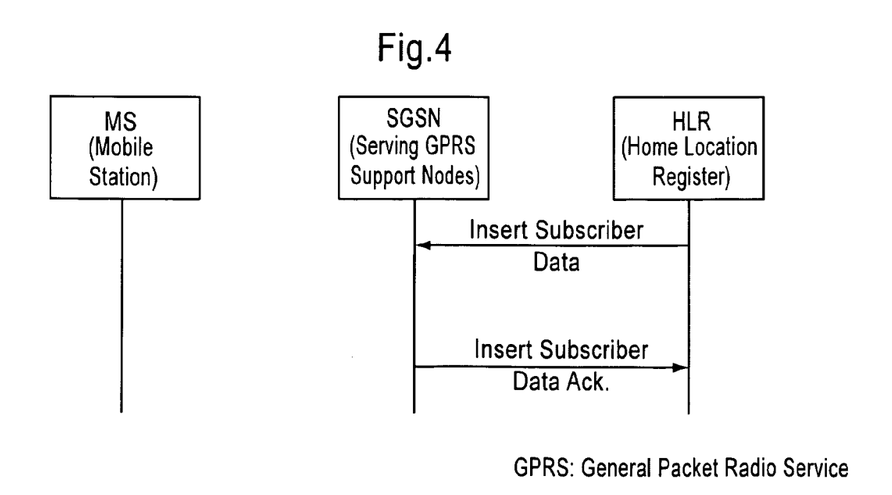
FIG. 4 shows a dynamic signalling according to an embodiment of the present invention for an already established PDP context.

An embodiment of the present invention is shown in FIG. 4 which shows that signaling between the HLR and SGSN can also be used during the second stage. That is, by using the standard MAP messages it is possible to bar a subscriber after a PDP context has been established for that subscriber.

Figure 5:
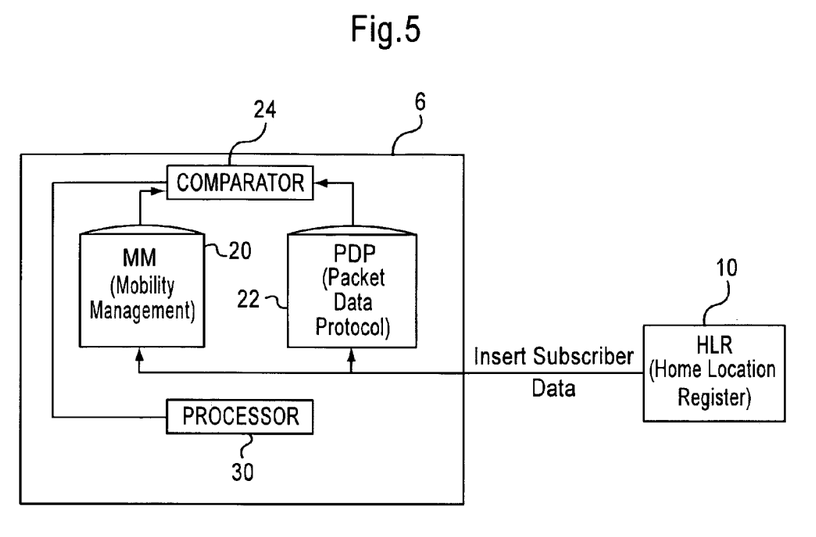
FIG. 5 shows the internal structure of the SGSN for carrying out an embodiment of the present invention.

FIG. 5 shows an embodiment of an SGSN of the present invention for barring an established PDP context. The SGSN includes or has access to a mobility management (MM) database 20 and a PDP context database 22. When the SGSN 6 receives the "insert subscriber data" message from the HLR 10 with the associated ODB parameters for barring an existing PDP context, these parameters are stored in the mobility management (MM) 20 and PDP 22 databases. Comparison circuitry 24 in the SGSN then checks if there is an existing PDP context for the subscriber, if there is then the SGSN will perform different handling using processor 30 depending on one of the following scenarios:

1. Barring a user completely from all packet oriented services provided by the APN 12, 14, when the user is in the home network indicated by the user station 4. In this scenario the SGSN will check if there are any existing PDP contexts for the user and if so bars all services by deactivating the existing PDP contexts.

2. Barring a user from a packet oriented service provided by at least one of the APN's 12 that are offered by the home network 16, when the user is roaming in the visited network 18 indicated by the user station 4'. In this scenario, if the user is roaming in the visited network, then the SGSN 6' will check via the GGSN whether the service to be barred is provided by an APN in the home network 16. If the APN is in the home network then the existing PDP context is deactivated. If the APN is not in the home network nothing is done and the existing PDP context including the bearer channel established between the user station 4' in the visited network and one of the APN's 14 in the visited network 18 is unaffected.

3. Barring a user from a packet oriented service provided by at least one of the APN's 14 that are offered by the visited network 18, when the user is in the home network. In this scenario, the SGSN 6 checks whether the user is located in the home network. If the user is a subscriber to the home network then the SGSN will check that the service provided by the relevant APN is in the HPLM. If the APN is not in the HPLMN (i.e. instead is an APN 14 in the visited network 18) then the existing PDP context is deactivated. However, if the APN is in the HPLMN (i.e. there is a PDP context established between a user station 4 in the home network 16 and a APN 12 in the home network) then nothing needs to be done and the established PDP context will be unaffected.

Figure 6:
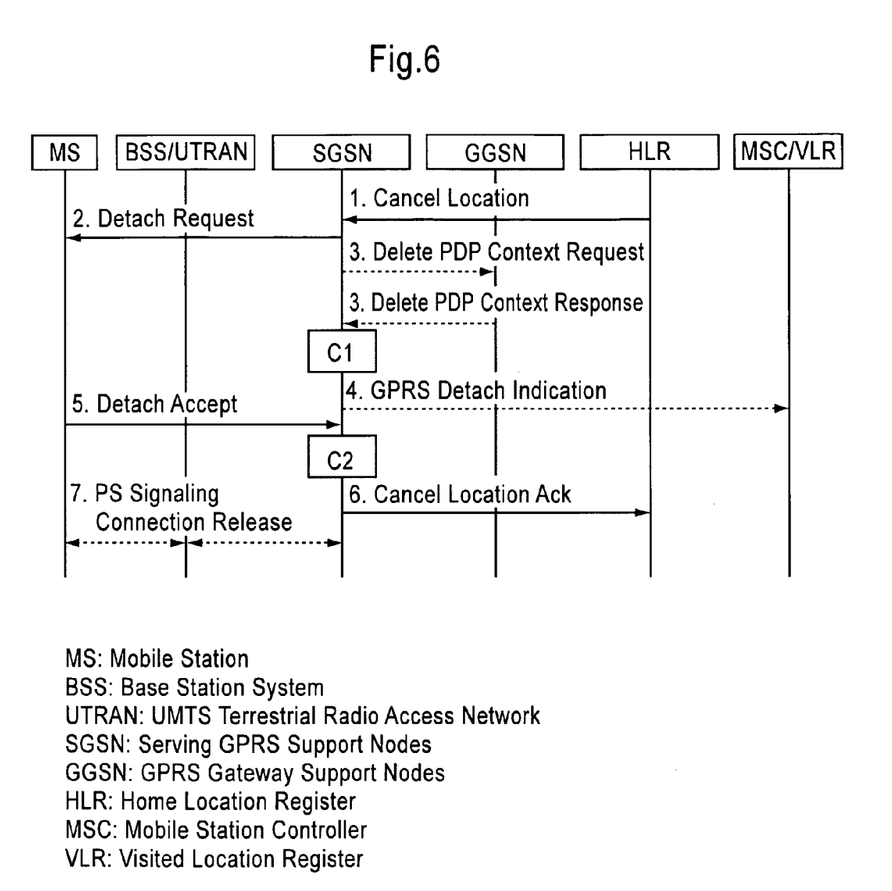
FIG. 6 shows an example of a detach procedure which is initiated by the HLR for deactivating a PDP context.

FIG. 6 shows an example of a detach procedure which is initiated by the HLR for deactivating a PDP context. The HLR uses this procedure for operator-determined purposes to request the removal of a subscriber's MM and PDP contexts at the SGSN. The HLR-initiated detach Procedure is as follows.

1) If the HLR wants to request the immediate deletion of a subscriber's MM and PDP contexts from the SGSN, the HLR shall send a Cancel Location (IMSI [international mobile subscriber identity], Cancellation Type) message to the SGSN with Cancellation Type set to Subscription Withdrawn.
2) The SGSN informs the MS that it has been detached by sending Detach Request (Detach Type) to the MS. Detach Type shall indicate that the MS is not requested to make a new attach and PDP contest activation.
3) The active PDP contexts in the GGSNs regarding this particular MS are deactivated by the SGSN sending Delete PDP Context Request (TEID) messages to the GGSNs. The GGSNs acknowledge with Delete PDP Context Response (TEID) messages.
4) If the MS was both IMSI- and GPRS-attached, the SGSN sends a GPRS Detach Indication (IMSI) message to the visitor location register (VLR) 9. The VLR removes the associated with the SGSN and handles paging and location update without going via the SGSN.
5) The MS sends a Detach Accept message to the SGSN any time after step 2.
6) The SGSN confirms the deletion of the MM and PDP contexts with a Cancel Location Ack (IMSI) message.
7) After receiving the Detach Accept message, if Detach Type did not request the MS to make a new attach, then the 3G-SGSN releases the packet switched (PS) signalling connection.

Thus, embodiments of the present invention allow the SGSN to receive barring information at any time in the form of dynamic signaling to the SGSN which can be performed on an already established PDP context for deactivating an already established PDP context under certain conditions. The dynamic signalling is performed between the HLR and SGSN using standard MAP messages. This is advantageous over conventional techniques which only deals with barring PDP context during activation and not with established PDP contexts. Another advantage is that an operator can deactivate a user's PDP context without barring the user completely.

The invention claimed is:

1. A method comprising:
   establishing a communication channel between a user station and an access point via a serving controller;
   receiving after said communication channel has been established subscriber data stored in a subscriber information database in the serving controller connected between said user station and said access point, said subscriber data comprising operator determined barring parameters;
   deciding at the serving controller that the user station is not permitted to access a service based on said subscriber data; and
   deactivating the established communication channel between the user station and the access point based on the transferred subscriber data, if said user station is not permitted to access said service.

2. The method of claim 1, wherein establishing a communication channel comprises performing an initialisation to determine whether the communication channel should be established.

3. The method of claim 2, wherein the initialisation is performed at the serving controller which determines whether the communication channel should be established based on the subscriber data transferred to it from the subscriber information database in an earlier initialization.

4. The method of claim 1, further comprising setting up a packet data protocol context to define the established communication channel.

5. The method of claim 4, wherein the packet data protocol context comprises a logical channel and a radio bear channel.

6. The method of claim 5, further comprising deactivating the packet data protocol context by failing to deliver the radio bearer channel.

7. The method of claim 1, wherein said method is performed in a wireless communication network.

8. The method according to claim 7, wherein the wireless communication network comprises a cellular communication network.

9. The method of claim 1, wherein the subscriber information database is located in a home network to which a user of the user station subscribes, the user station also being able to roam into a visited network, and wherein the user station is connected to a first serving controller while in the first network and to a second serving controller while in the visited network, the first and second serving controllers connected to one another through a gateway controller.

10. The method of claim 9, further comprising providing corresponding services to the user station, wherein the home and visited networks each have a plurality of access points configured to provide the corresponding services to the user station over the established communication channels.

11. The method of claim 10, wherein said deactivating comprises deactivating all of the established communications channels for services provided by the plurality of access points in the home and visited networks by the first serving controller while in the home network.

12. The method of claim 10, wherein said deactivating comprises deactivating the established communication channel between the user station and the services provided by the plurality of access points in the visited network by the first service controller while in the home network.

13. The method of claim 10, wherein said deactivating comprises deactivating the established communication channel between the user station and the services provided by the access points in the home network by the second serving controller while in the visited network.

14. The method of claim 4, wherein the established communication channel is deactivated by deactivating the packet data protocol context.

15. A system comprising:
an access point configured to provide a service to a user station of the network;
a subscriber information database configured to store subscriber data corresponding to the user station; and
a serving controller configured to establish a communication channel between the user station and the access point to deliver the service,
wherein the subscriber information database is operable to transfer the subscriber data to the serving controller after the communication channel is established, and wherein the serving controller is further configured to
determine that the user station is not permitted to access the service based on said subscriber data transferred after the communication channel is established, said subscriber data comprising operator determined barring parameters; and
deactivate the established communication channel based on the transferred subscriber data transferred after the communication channel is established, if said user station is not permitted to access said service.

16. The system of claim 15, wherein a packet data protocol context is set up to define the established communication channel.

17. The system of claim 16, wherein the packet data protocol context comprises a logical channel and a radio bear channel.

18. The system of claim 17, wherein the packet data protocol context is deactivated by failing to deliver the radio bearer channel.

19. The system of claim 16, wherein the established communication channel is deactivated by deactivating the packet data protocol context.

20. An apparatus comprising:
an establisher configured to establish a communication channel between a user station and an access point which provides a service to the user station,
a receiver configured to receive, after said communication channel has been established, subscriber data corresponding to the user station, said subscriber data comprising operator determined barring parameters,
a determiner configured to determine, based on said subscriber data, received after the communication channel is established that the user station is not permitted to access the service, and
a deactivator configured to deactivate the established communication channel, if said user station is not permitted to access said service.

21. The apparatus of claim 20, wherein a packet data protocol context is set up to define the established communication channel.

22. The apparatus of claim 21, wherein the packet data protocol context comprises a logical channel and a radio bearer channel.

23. The apparatus of claim 22, wherein the packet data protocol context is deactivated by failing to deliver the radio bearer channel.

24. The apparatus of claim 21, wherein the established communication channel is deactivated by deactivating the packet data protocol context.

25. The apparatus of claim 20, wherein said apparatus is a serving controller.

26. An apparatus comprising:
establishing means for establishing a communication channel between a user station and an access point,
means for receiving, after said communication channel has been established, subscriber data corresponding to the user system, said subscriber data comprising operator determined barring parameters,
means for determining, based on said subscriber data, received after the communication channel is established that the user station is not permitted to access the service, and
means for deactivating the established communication channel, if said user station is not permitted to access said service.

27. The apparatus of claim 26, further comprising means for setting up a packet data protocol context to define the established communication channel.

28. The apparatus of claim 27, wherein the packet data protocol context comprises a logical channel and a radio bearer channel.

29. The apparatus of claim 28, further comprising means for deactivating the packet data protocol context by failing to deliver the radio bearer channel.

30. The apparatus of claim 27, further comprising means for deactivating the established communication channel by deactivating the packet data protocol context.

31. A computer program, embodied on a computer-readable medium, the computer program controlling a processor to perform the following:
establishing a communication channel between a user station and an access point via a serving controller,
receiving, after said communication channel has been established, subscriber data stored in a subscriber information database in a serving controller connected between said user station and said access point, said subscriber data comprising operator determined barring parameters;
deciding at the serving controller that the user station is not permitted to access said service based on said subscriber data; and
deactivating the established communication channel between the user station and the access point based on the transferred subscriber data, if said user station is not permitted to access said service.

* * * * *